(12) United States Patent
Sudzilouski (10) Patent No.: US 8,938,738 B2
(45) Date of Patent: Jan. 20, 2015

(54) SHARED USER-MODE FOR CONTROLLING SYNCHRONIZED ACCESS TO A SHARED RESOURCE

(75) Inventor: Uladzislau Sudzilouski, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1129 days.

(21) Appl. No.: 12/147,671

(22) Filed: Jun. 27, 2008

(65) Prior Publication Data

US 2009/0328041 A1    Dec. 31, 2009

(51) Int. Cl.
*G06F 9/46* (2006.01)
*G06F 9/52* (2006.01)

(52) U.S. Cl.
CPC .................................... *G06F 9/526* (2013.01)
USPC ........................................... 718/102; 718/104

(58) Field of Classification Search
None
See application file for complete search history.

(56) References Cited

U.S. PATENT DOCUMENTS

| | | | |
|---|---|---|---|
| 5,991,845 A * | 11/1999 | Bohannon et al. | 710/200 |
| 6,493,804 B1 * | 12/2002 | Soltis et al. | 711/152 |
| 6,886,081 B2 | 4/2005 | Harres | |
| 7,003,702 B2 * | 2/2006 | Budd et al. | 714/52 |
| 7,080,376 B2 | 7/2006 | Buch | |
| 7,100,161 B2 | 8/2006 | Latour | |
| 7,188,344 B1 | 3/2007 | Blue | |
| 7,234,144 B2 | 6/2007 | Wilt et al. | |
| 7,493,618 B2 * | 2/2009 | Michael et al. | 718/102 |
| 2005/0246505 A1 | 11/2005 | McKenney et al. | |
| 2006/0031844 A1 | 2/2006 | Dice et al. | |
| 2006/0167921 A1 * | 7/2006 | Grebus et al. | 707/102 |
| 2008/0005741 A1 | 1/2008 | Terrell | |

OTHER PUBLICATIONS

Process Synchronization and Communication Using Shared Memory, downloaded Apr. 25, 2008.
Richter, "Concurrent Affairs: Build a Richer Thread Synchronization Lock," Microsoft Corporation, downloaded Apr. 25, 2008.
Chou, "A Quick and Versatile Synchronization Object," Jun. 1998, Microsoft Corporation.

* cited by examiner

*Primary Examiner* — Meng An
*Assistant Examiner* — Wissam Rashid
(74) *Attorney, Agent, or Firm* — Steve Crocker; Jim Ross; Micky Minhas (57) ABSTRACT

Technologies are described herein for implementing shared locks for controlling synchronized access to a shared resource. In one method, in a user mode of an operating system, a notification is received indicating that a first process begins execution. The first process is adapted to acquire the shared lock during execution of the first process. Upon receiving the notification, it is determined whether the first process terminates execution without releasing the shared lock. Upon determining that the first process terminates execution without releasing the shared lock, the shared lock is released for access by a second process.

9 Claims, 5 Drawing Sheets

```
                                                    300
typedef struct SharedLockData                      ↙
{
    ALLOCATION_INDEX m_cAllocationIndex;  ←—— 302
    volatile ULONG   m_cRef;              ←—— 304
    union
    {
        struct
        {
            volatile ULONG uIPSID;        ←—— 306  ⎫
            volatile ULONG cWaiters;      ←—— 308  ⎬ 316  ⎫
        };                                         ⎭      ⎬ 318
        volatile __int64 Exchange;        ←—— 310         ⎭
    };
    volatile DWORD  m_dwThreadId;         ←—— 312
    DWORD           m_dwRecursionCount;   ←—— 314
} SharedLockData;
```

```
typedef struct SharedLockData
{
    ALLOCATION_INDEX m_cAllocationIndex;     ⟵ 302
    volatile ULONG   m_cRef;                  ⟵ 304
    union
    {
        struct
        {
            volatile ULONG  ulPSID;           ⟵ 306
            volatile ULONG  cWaiters;         ⟵ 308
        };
        volatile __int64 Exchange;            ⟵ 310
    };
    volatile DWORD   m_dwThreadId;            ⟵ 312
    DWORD            m_dwRecursionCount;      ⟵ 314
} SharedLockData;
```

SHARED USER-MODE FOR CONTROLLING SYNCHRONIZED ACCESS TO A SHARED RESOURCE

BACKGROUND

In many information processing applications, multiple executing entities attempt to access data concurrently. In one example, in an email application, multiple processes may attempt to access emails, profiles, stores, and other related data at the same time. In this case, a single program executes multiple threads concurrently accessing the same data. In another example, in a database application, multiple users may attempt to access the same database tables, records, and fields at the same time. In this case, multiple programs operated by multiple users may concurrently access the same data. As used herein, an entity may refer to processes, threads, tasks, processors, programming objects, and the like.

Concurrent access to the same data, if left uncontrolled, can potentially lead to data corruption. For example, consider the following scenario in which two computers, A and B, both attempt to remove one item from inventory by subtracting one from an inventory field in a database:

1. The initial inventory field value is two.
2. Computer A reads the inventory field value (two) to its local storage value.
3. Computer B reads the inventory field value (two) to its local storage value.
4. Computer A subtracts one from its local storage value (two), yielding a new local storage value of one.
5. Computer B subtracts one from its local storage value (two), yielding a new local storage value of one.
6. Computer A writes its local storage value (one) to the inventory field value.
7. Computer B writes its local storage value (one) to the inventory field.
8. The final inventory field value is one.

As indicated above, the final inventory field value is one. However, it is clear that the final inventory field value should be zero because two items have been removed from inventory. The illustrated scenario shows that two or more entities concurrently accessing the same data value may corrupt the value, potentially leading to disastrous consequences.

Programmers have advanced a variety of approaches to address problems arising from concurrent processing. On a general level, many programming systems provide synchronization services to provide certain guarantees in light of potential concurrency issues. For example, some programming environments support simple synchronization mechanisms such as semaphores, locks, critical sections, and mutual exclusion objects ("mutexes" or "mutex objects"). Each of these mechanisms controls, in one form or another, concurrent access to a shared resource. Examples of mutex objects include mutex objects, an implementation of which is provided as part of the WIN32 application programming interface within the WINDOWS operating system also from MICROSOFT CORPORATION. Many WINDOWS-based programs, such as email and database computer applications, utilize these mutex objects for synchronizing access to various shared data.

Mutex objects synchronize access to a shared resource, such as shared memory, from multiple processes executing on a single machine. Generally, mutex objects are kernel objects. A kernel object is a memory block allocated by the kernel and is accessible only by the kernel. As such, computer applications operating in user mode are typically transitioned to kernel mode before mutex objects can be utilized. This transition between user mode and kernel mode can result in significant overall performance cost, especially when mutex objects are often utilized.

It is with respect to these considerations and others that the disclosure made herein is presented.

SUMMARY

Technologies are described herein for providing user-mode shared locks. In particular, through the utilization of the technologies and concepts presented herein, user-mode shared locks are provided that can replace conventional kernel-mode mutex objects when multiple processes concurrently access the same shared resource, such as shared memory. These shared locks are adapted to provide much of the same functionality as mutex objects, except that shared locks operate in user mode instead of kernel mode. As a result, in contrast with the mutex objects, the shared locks may provide at least a reduction in performance cost caused by transitions between user mode and kernel mode, especially when little or no contention is on the shared locks.

According to one aspect presented herein, a methodology is provided for implementing shared locks for controlling synchronized access to a shared resource. In a user mode of an operating system, a second process receives a notification indicating that a first process begins execution. The first process may be adapted to acquire the shared lock during execution of the first process. Upon receiving the notification, the second process determines whether the first process terminates execution without releasing the shared lock. Upon determining that the first process terminates execution without releasing the shared lock, the second process releases the shared lock on behalf of the first process (i.e., the terminating process) such that the shared lock can be acquired by a second process or any other process capable of utilizing the shared lock.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing user-mode shared locks. Through the utilization of the technologies and concepts presented herein, user-mode shared locks are provided that can replace conventional kernel-mode mutex objects when multiple processes concurrently access the same shared resource, such as shared memory. These shared locks are adapted to provide much of the same functionality as mutex objects, except that shared locks operate in user mode instead of kernel mode. That is, in contrast with the mutex objects, a transition between user mode and kernel mode is not required to acquire the shared lock. As a result, performance cost caused by transitions between user mode and kernel mode can be reduced or eliminated by operating shared locks in place of mutex objects. It should be understood, however, that even with shared locks, a transition from user mode to kernel mode may occur when the shared lock is busy, having been acquired by another user.

As used herein, a conventional lock, in contrast with a user-mode shared lock as described in greater below, refers to a mechanism for synchronizing access to a shared resource by multiple threads within a single process. When one thread desires to access the shared resource, the thread acquires the lock, which prevents other threads from accessing the shared resource. Once the thread finishes executing, the thread releases the lock so that other threads may access the lock. Locks generally operate entirely in user mode, and therefore do not suffer performance costs arising from transitioning between user mode and kernel mode. Unlike mutex objects, however, locks can only be used by one process at a time, primarily due to security issues with operating in user mode. As such, locks are typically not suitable for situations where multiple processes concurrently access a shared resource.

Embodiments described below introduce the concept of user-mode shared locks. In contrast with conventional locks, shared locks are capable of synchronizing access to a shared resource by multiple processes. In one embodiment, a linked list is utilized to enable a first process to monitor a second process to determine whether the second process has terminated. Further, shared locks operate in user mode, which reduces or eliminates any performance cost caused by transitioning between user mode and kernel mode.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
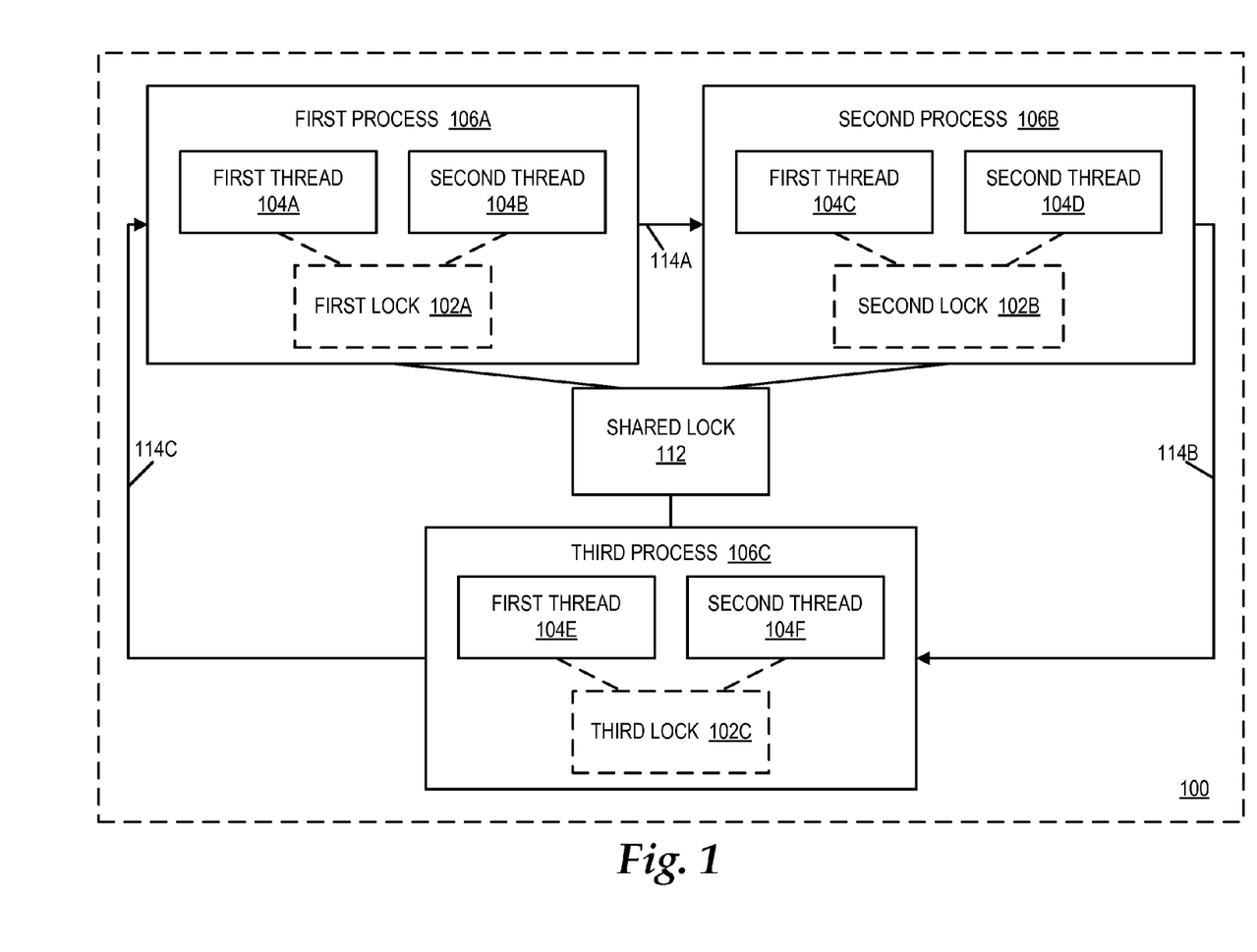
FIG. 1 is a block diagram showing an computer adapted to implement a shared lock, in accordance with one embodiment.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for implementing shared locks will be described. FIG. 1 illustrates a computer 100 implementing a shared lock 112 as a replacement for conventional mutex objects. In contrast to the shared lock 112, FIG. 1 also illustrates a plurality of conventional locks 102A-102C, which are denoted by dashed lines.

It should be appreciated that the conventional locks 102A-102C are shown merely as a reference to contrast the operation of the shared lock 112 according to embodiments. The first lock 102A is associated with threads 104A-104B executing in a first process 106A. The second lock 102B is associated with threads 104C-104D executing in a second process 106B. The third lock 102C is associated with threads 104E-104F executing in a third process 106C. While only three processes, each of which includes two threads, are illustrated in FIG. 1, it should be appreciated that the computer 100 may include any number of processes and threads.

As illustrated in FIG. 1, each of the locks 102A-102C is implemented by only one process. For example, the first lock 102A can be utilized by the threads 104A-104B executing in the first process 106A, but cannot be utilized by the threads 104C-104F executing in the second process 106B and the third process 106C. As such, the locks 102A-102C are suitable for handling only synchronized access to a resource by multiple threads within the same process. The locks 102A-102C are not suitable for handling synchronized access to a shared resource by separate processes.

Additional details will now be provided regarding the shared lock 112. For the sake of simplicity, only one shared lock is illustrated in FIG. 1. However, it should be appreciated that multiple shared locks may be utilized in other implementations to control access to multiple shared resources. As previously discussed, the conventional mutex object can be replaced by the shared lock 112 according to embodiments. As illustrated in FIG. 1, the processes 106A-106C can access the shared lock 112.

Further, the processes 106A-106C are adapted to monitor each other in a manner similar to a circular linked list (referred to herein as a circular linked list configuration). As such, if one process terminates, another process will be adapted to monitor the terminated process and will therefore be able to clean up any abandoned locks resulting from the terminated process. For example, the second process 106B monitors the first process 106A as denoted by a first pointer 114A, and the third process 106C monitors the second process 106B as denoted by a second pointer 204B. The first process 106A monitors the third process 106C as denoted a third pointer 204C. It should be appreciated that the pointers 114A and 204B-204C are shown merely to illustrate an exemplary implementation of the circular linked list configuration in which the processes 106A-106C monitor each other. The processes 106A-106C may or may not be connected or linked in any other manner like an actual circular linked list.

It should further be appreciated that the circular linked list configuration does not necessarily ensure a predefined order for acquiring the shared lock 112. For example, if two threads are waiting for the shared lock 112, the circular linked list configuration does not ensure that either thread has priority for acquiring the shared lock 112. In one embodiment, a fair lock mechanism may be implemented to ensure that one thread has priority to acquire the shared lock 112 over another thread. The fair lock mechanism may be implemented based on first-in-first-out ("FIFO") ordering, in which the first thread that reserves the shared lock 112 is the first thread to acquire the shared lock 112.

Figure 2:
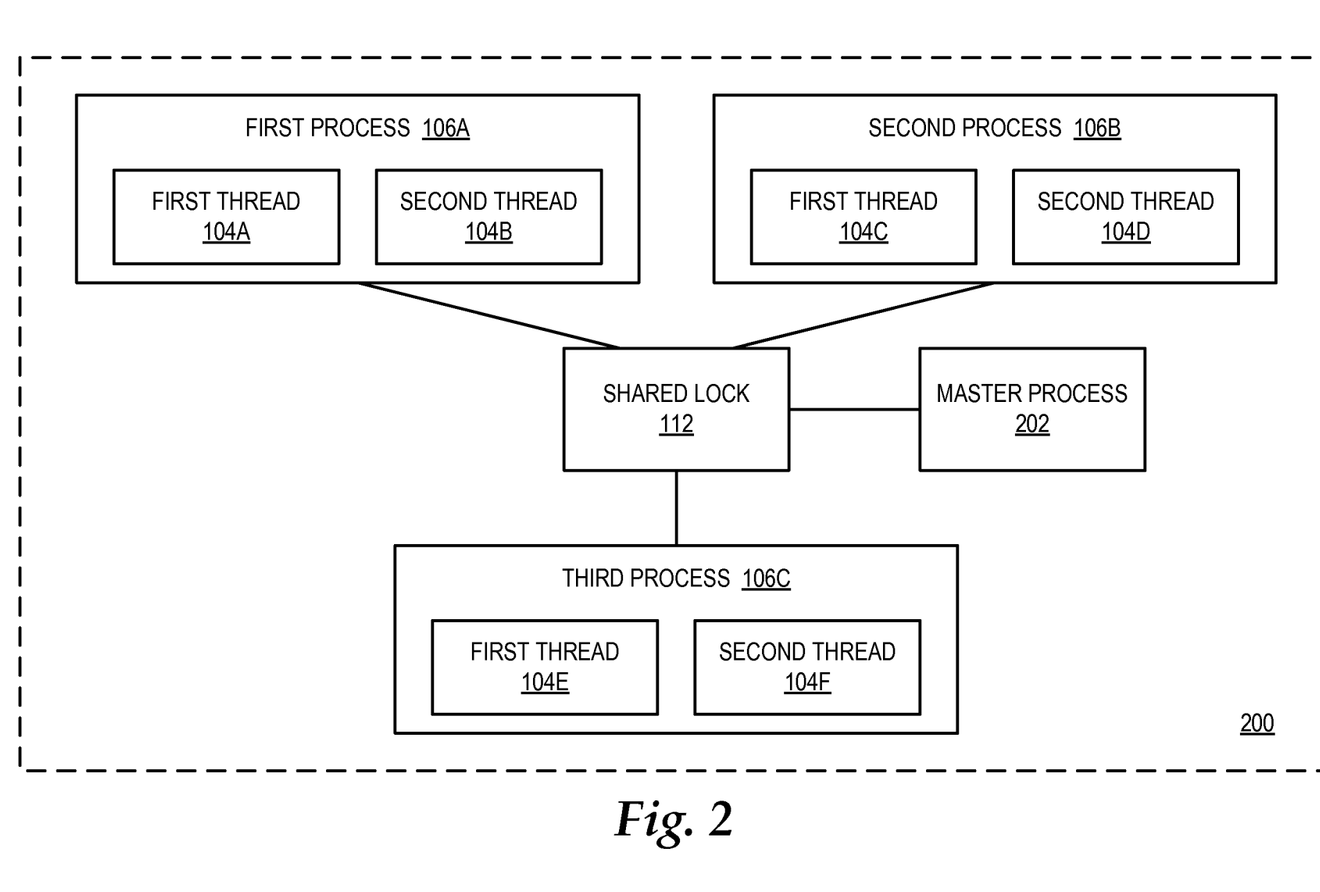
FIG. 2 is a block diagram showing a computer adapted to implement a shared lock and a master process, in accordance with one embodiment.

With conventional mutex objects, an operating system will be aware when a process starts and ends. This information is made available through kernel mode. However, since the shared lock 112 operates entirely in user mode, there is a goal to detect when a process terminates abnormally. Thus, the second process 106B may be configured to monitor at least the first process 106A. Likewise, the third process 106C may be configured to monitor at least the second process 106B, and the first process 106A may be configured to monitor at least the third process 106C. In one embodiment, the responsibility for the processes 106A-106C to monitor the other processes 106A-106C is determined by a circular linked list configuration as previously described. In another embodiment, a master process 202, as illustrated in the computer 200 of FIG. 2, may be configured to monitor the processes 106A-106C and arbitrate access to the shared lock 112. As illustrated in FIG. 2, the pointers 114A-114C may be removed when the master process 202 is utilized because the master process 202 handles the monitoring responsibility.

Referring again to FIG. 1, in an illustrative scenario, the first process 106A acquires the shared lock 112, which controls access to data stored in a portion of memory. In one embodiment, the linked list configuration is built prior to the first process 106A acquiring the shared lock 112. Thus, each of the processes 106A-106C is aware of its responsibility for monitoring other processes before the first process 106A acquires the shared lock 112. As illustrated in FIG. 1, the second process 106B is monitoring the first process 106A. In other implementations, the third process 106C may also monitor the first process 106A.

It should be appreciated that processes can be added to the linked list configuration at a later time (i.e., when another process is started by the user). The new process may notify other processes about its creation via a broadcast message before acquiring the shared lock 112. Alternatively, the new process may notify the master process 202 instead of all of the other processes. The new process may also start to monitor one of the other processes before acquiring the shared lock 112. In one embodiment, the methodology that all processes use to determine who monitors whom is based on program security identifier ("PSID") ordering. The PSID ordering ensures that processes will be able to build a correct, circular linked list configuration in which each process is monitored by one or more other processes.

In normal operation, the first process 106A will finish executing and then release the shared lock 112. However, if the first process 106A abnormally terminates, then the first process 106A will fail to release the shared lock 112. In this case, the second process 106B will recognize that the first process 106A abnormally terminated and subsequently will release the shared lock 112 (e.g., transition the shared lock 112 from a busy state to an abandoned state). Upon the release of the shared lock 112, either through normal operation or abnormal termination, the second process 106B (or the third process 106C) can acquire the shared lock 112 by transitioning the shared lock 112 from the abandoned state to the busy state.

If the second process 106B acquires the shared lock 112, the third process 106C then begins to monitor the second process 106B to determine if the second process 106B abnormally terminates. The sequence of one process accessing the shared lock 112 and the next process in the circular linked list configuration monitoring the previous process may continue until the every process in the circular linked list configuration has accessed the shared lock 112. In one embodiment, processes may be associated with a suitable process identifier for identifying the processes with respect to the shared lock 112.

Figure 3:
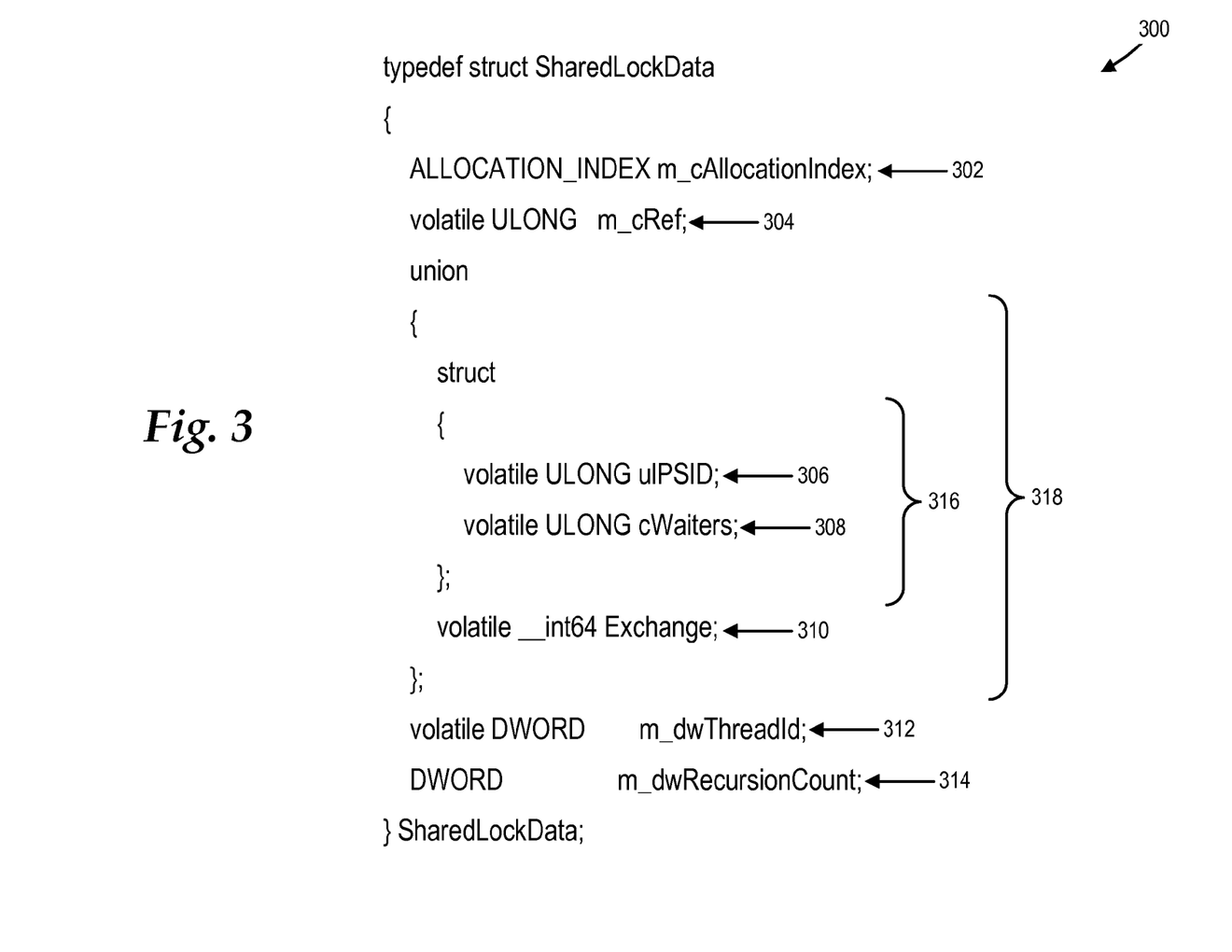
FIG. 3 is a diagram illustrating an exemplary data structure for implementing the shared lock, in accordance with one embodiment.

Referring now to FIG. 3, additional details will be provided regarding the shared lock 112. In particular, FIG. 3 illustrates an exemplary data structure 300 for implementing the shared lock 112. In one embodiment, the data structure 300 is stored on a computer-readable storage medium, which can then be executed on any suitable computer. Although not so limited, the data structure 300 in FIG. 3 is written in the C programming language. It should also be appreciated that the data structure 300 shown in FIG. 3 is merely illustrative. It should be appreciated that other data structures and approaches for describing and implementing the shared lock 112 may be contemplated by those skilled in the art. It should further be appreciated that the shared lock 112 may reside in a shared memory accessible by all processes that use the shared lock 112.

As illustrated in FIG. 3, the data structure 300 includes an allocation index 302, a first reference counter 304, a PSID 306, a second reference counter 308, a compare-and-swap operation 310, a thread ID 312, and a recursion counter 314. The allocation index 302 is a unique identifier that identifies the shared lock 112. In this way, a plurality of shared locks can be identified and distinguished. The allocation index 302 may be equivalent of a mutex name (e.g., a number, a string). The first reference counter 304 is a reference counter indicating a total number of entities using the shared lock 112. An entity may be a thread, a process, an object, or the like capable of using the shared lock 112.

The PSID 306 and the second reference counter 308 are contained in an embedded data structure 316 as designated by the keyword "STRUCT." The PSID 306 is a unique identifier that identifies the process that has acquired the shared lock 112. Although not so limited, the PSID 306 is described in FIG. 3 as a 32-bit integer as designated by the keyword "ULONG." However, the PSID 306 may be any suitable string of characters and/or numbers in other embodiments. In one embodiment, the PSID 306 is zero when the shared lock 112 is not owned by any thread, and is 0xffffffff when the shared lock 112 is abandoned. The second reference counter 308 is a reference counter indicating the number of outstanding threads waiting for the shared lock 112. The second reference counter 308 is incremented as threads waiting for the shared lock 112 are added. The second reference counter 308 is decremented as the waiting threads acquire the shared lock 112 or by timing out.

An illustrative operation of the second reference counter 308 is as follows. Consider a first thread that currently owns the shared lock 112. When a second thread cannot acquire ownership of the shared lock 112 (e.g., the shared lock 112 has been acquired by another thread), the second thread increments the second reference counter 308. By incrementing the second reference counter 308, the second thread informs the first thread that another thread is waiting to acquire the shared lock 112. When the first thread releases the shared lock 112, the first thread checks the value of the second reference counter 308. If the value of the second reference counter 308 is non-zero, the first thread informs the waiting threads that the shared lock 112 is free to be acquired. The first thread may inform the waiting threads via an event object, according to one embodiment. If the first thread abnormally abandons the shared lock 112, another process can signal that the shared lock 112 is free to be acquired.

The data structure 316 is also combined with the compare-and-swap operation 310 to form another embedded data structure 318 as designated by the keyword "UNION." The compare-and-swap operation 310 atomically changes the PSID 306 and the second reference counter 308. The thread ID 312 is a unique identifier indicating the thread that currently owns the shared lock 112. The thread ID 312 may be used to allow recursive lock entrance. The recursion counter 314 is a counter indicating the number of times that the same thread has acquired the shared lock 112. In particular, the recursion counter 314 is incremented as the shared lock 112 is acquired by a given function, and the recursion counter 314 is decremented as the shared lock 112 is released by the function. Once the recursion counter 314 reaches zero, the shared lock 112 is released and is accessible to other threads and processes.

Figure 4:
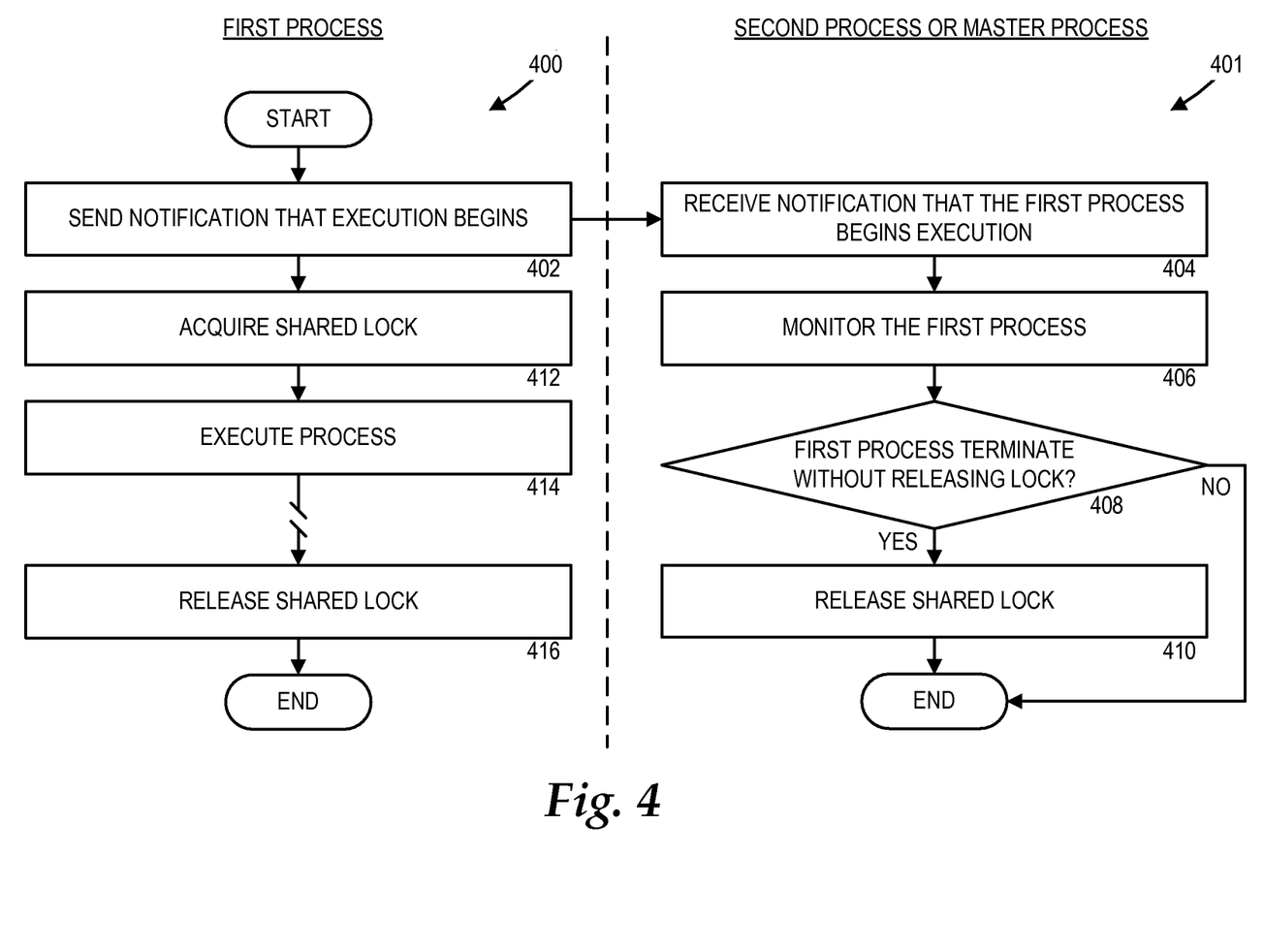
FIG. 4 is a flow diagram showing an illustrative process for implementing the shared lock, in accordance with one embodiment.

Turning now to FIG. 4, additional details will be provided regarding the operation of the shared lock 112. In particular, FIG. 4 shows a flow diagram illustrating aspects of one method provided herein for implementing the shared lock 112. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 4, the diagram includes a first routine 400 and a second routine 401. The first routine 400 and the second routine 401 each begin at operation 402. After operation 402, the first routine 400 branches to operations 412-416, and the second routine 401 branches to operations 406-410. The first routine 400 and the second routine 401 each begin at operation 402, where the first process 106A sends a notification indicating that it is beginning execution. In one embodiment, the notification is a broadcast message sent by the first process 106A to one or more of the other processes 106B-106C. In another embodiment, the notification may be sent by the first process 106A to the master process 202. In other embodiments, the notification may be sent via other suitable mechanisms. The notification may also be provided by an operating system or other suitable application. Upon the first process 106A sending the notification indicating that it is beginning execution, the first routine 400 proceeds to operation 412, and the second routine 401 proceeds to operation 404.

Referring to the second routine 401, at operation 404, the second process 106B or the master process 202 receives the notification from the first process 106A. The second routine 401 then proceeds to operation 406 where the second process 106B or the master process 202 monitors the first process 106A. In particular, the second process 106B or the master process 202 may monitor the first process 106A to determine whether the first process 106A terminates without releasing the shared lock.

For example, referring to the first routine 400, upon sending the notification that it is beginning execution at operation 402, the first routine 400 proceeds to operation 412 where the first process 106A acquires the shared lock 112. For example, the first process 106A may transition the shared lock 112 from any previous state to a busy state. Upon acquiring the shared lock 112, the first routine 400 proceeds to operation 414. At operation 414, the first process 106A executes and access the data associated with the shared lock 112. If the first process 106A successfully executes, then the first routine 400 proceeds to operation 416 where the first process 106A releases the shared lock 112. However, if the first process 106A abnormally terminates before completing execution, then the first routine 400 will not proceed to operation 416, and the first process 106A will not release the shared lock 112. Without further intervention, the other processes 106B-106C will not be aware that the shared lock 112 is available.

Referring again to the second routine 401, at operation 406, the second process 106B or the master process 202, as shown in FIG. 3, will monitor the first process 106A until it terminates. Upon detecting that the first process 106A terminates, the second routine 401 proceeds to operation 408 where the second process 106B or the master process 202 determines whether the first process 106A abnormally terminated without releasing the shared lock 112. If the first process 106A terminates normally (i.e., the first routine 400 successfully performs the operation 416), then the second routine 401 ends. If the first process 106A abnormally terminates (i.e., the first routine 400 crashes at operation 414 and does not proceed to operation 416), then the second routine 401 proceeds to operation 410. At operation 410, the second process 106B or the master process 202 releases the shared lock 112. For example, the second process 106B or the master process 202 may transition the shared lock 112 from a busy state to an abandoned state. Once the shared lock 112 is in the abandoned state, other processes can access the shared lock 112.

Figure 5:
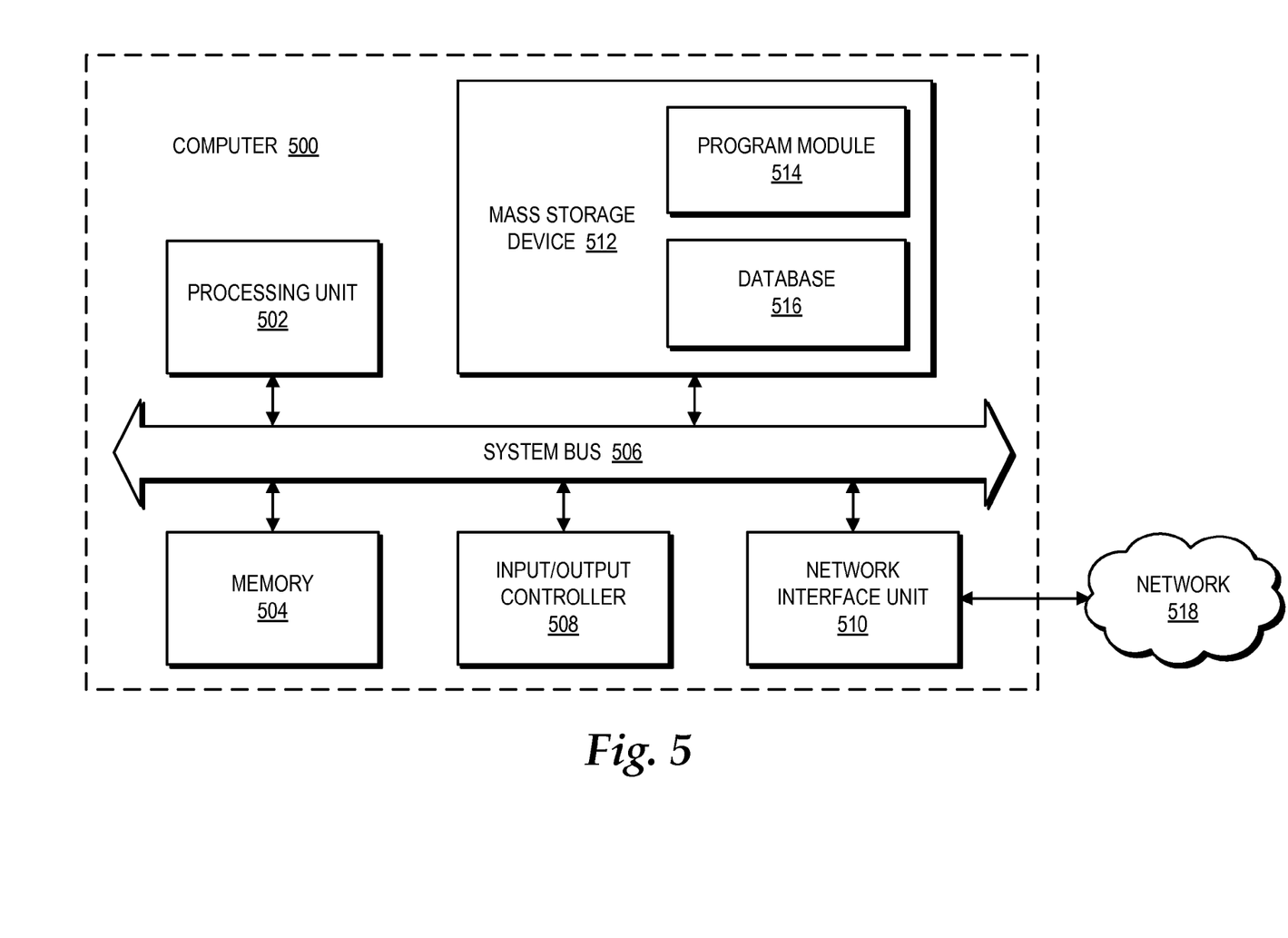
FIG. 5 is a computer architecture diagram showing aspects of an illustrative computer hardware architecture for a computing system capable of implementing aspects of the embodiments presented herein.

Referring now to FIG. 5, an exemplary computer architecture diagram showing aspects of a computer 500 is illustrated. Examples of the computer 500 may include computers 100, 200. The computer 500 includes a processing unit 502 ("CPU"), a system memory 504, and a system bus 506 that couples the memory 504 to the CPU 502. The computer 500 further includes a mass storage device 512 for storing one or more program modules 514 and one or more databases 516. In one embodiment, the program modules 514 may be adapted to implement the data structure 300 of FIG. 3. The program modules 514 may also include an operating system. The mass storage device 512 is connected to the CPU 502 through a mass storage controller (not shown) connected to the bus 506. The mass storage device 512 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 518. The computer 500 may connect to the network 518 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

Based on the foregoing, it should be appreciated that technologies for providing user-mode shared locks are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-readable storage medium comprising one of an optical disk, a magnetic storage device, or a solid state storage device having computer-readable instructions stored thereon for a shared lock for implementation across multiple processes, the shared lock adapted to be executed entirely in a user mode of an operating system capable of executing in the user mode and in a kernel mode, and the shared lock for controlling synchronized access to a shared resource, the computer-readable instructions, when executed by a computer, cause the computer to implement:

an allocation index identifying the shared lock;
a first counter indicating a number of capable of using the shared lock to access the shared resource;
a process identifier uniquely identifying a first process that has currently acquired the shared lock;
a second counter indicating a number of outstanding processes waiting for the shared lock, the second counter being incremented by a second process when attempting to acquire the shared lock that is currently acquired by the first process, the second counter being decremented as outstanding processes acquire the shared lock or by timing out;
a third counter to indicate whether a shared lock is available by indicating the number of times that a process has acquired the lock, decremented by the number of times that the process has released the lock; and
the second process to release the shared lock on behalf of the first process if the first process has terminated execution without releasing the shared lock.

2. The computer-readable storage medium of claim 1, wherein the computer-readable instructions further cause the computer to perform an operation to atomically change the process identifier and the second counter.

3. The computer-readable storage medium of claim 1, wherein the computer-readable instructions further cause the computer not to release the process identifier for use by another process until the shared lock is released by the process.

4. A computer-implemented method to implement a shared lock across multiple processes, the shared lock adapted to be executed entirely in a user mode of an operating system capable of execution in the user mode and in a kernel mode, and the shared lock controlling synchronized access to a shared resource, the method comprising:

generating an allocation index identifying the shared lock;
indicating, in a first counter, a number of processes capable of using the shared lock to access the shared resource;
generating a process identifier uniquely identifying a first process that has currently acquired the shared lock;
indicating, in a second counter, a number of outstanding processes waiting for the shared lock;
incrementing the second counter when a second process attempts to acquire the shared lock that is currently acquired by the first process,
decrementing the second counter as outstanding processes acquire the shared lock or by timing out;
indicating, in a third counter, whether a shared lock is available by indicating the number of times that a process has acquired the lock and decrementing the third counter by the number of times that the process has released the lock; and
providing for the second process to release the shared lock on behalf of the first process if the first process has terminated execution without releasing the shared lock.

5. The computer-implemented method of claim 4 and further comprising atomically changing the process identifier and the second counter.

6. The computer-implemented method of claim 4 and further comprising not releasing the process identifier for use by another process until the shared lock is released by the process.

7. A system to implement a shared lock across multiple processes, the shared lock adapted to be executed entirely in a user mode of an operating system capable of execution in the user mode and in a kernel mode, and the shared lock controlling synchronized access to a shared resource, the system comprising a computer implementing the multiple processes, the computer comprising:

a memory device containing computer-readable instructions;
a processor, communicatively coupled to the memory device and executing the computer-readable instructions to:
generate an allocation index identifying the shared lock;
indicate, in a first counter, a number of entities capable of using the shared lock to access the shared resource;
generate a process identifier uniquely identifying a first process that has currently acquired the shared lock;
indicate, in a second counter, a number of outstanding processes waiting for the shared lock;
increment the second counter when a second process attempts to acquire the shared lock that is currently acquired by the first process,
decrement the second counter as outstanding processes acquire the shared lock or by timing out;
indicate, in a third counter, whether a shared lock is available by indicating the number of times that a process has acquired the lock and decrementing the third counter by the number of times that the process has released the lock; and
provide for the second process to release the shared lock on behalf of the first process if the first process has terminated execution without releasing the shared lock.

8. The system of claim 7 wherein the processor further executes the operating instructions to atomically change the process identifier and the second counter.

9. The system of claim 7 wherein the processor further executes the operating instructions and does not release the process identifier for use by another process until the shared lock is released by the process.

* * * * *